US005781852A

United States Patent [19]

Gropper

[11] Patent Number: 5,781,852

[45] Date of Patent: Jul. 14, 1998

[54] ALERT RECEIVER INTERFACE

[76] Inventor: Daniel R. Gropper, P.O. Box 625, Vienna, Va. 22183

[21] Appl. No.: 692,948

[22] Filed: Aug. 7, 1996

Related U.S. Application Data

[63] Continuation-in-part of Ser. No. 337,198, Nov. 7, 1994, Pat. No. 5,574,999, which is a continuation-in-part of Ser. No. 207,537, Mar. 7, 1994, Pat. No. 5,444,433.

[51] Int. Cl.[6] ........ H04B 1/16

[52] U.S. Cl. ........ 455/227; 455/181.1; 455/185.1; 455/186.1

[58] Field of Search ........ 455/161.1, 161.2, 455/181.1, 184.1, 185.1, 186.1, 227, 228; 340/539, 825.44, 311.1; 379/88, 89, 67

[56] References Cited

U.S. PATENT DOCUMENTS 4,065,642 12/1977 McClure .
4,072,824 2/1978 Phillips .
4,499,601 2/1985 Matthews ........ 455/166.2
4,821,308 4/1989 Hashimoto .
4,893,335 1/1990 Fuller .
4,942,598 7/1990 Davis .
4,961,216 10/1990 Baehr .
5,159,626 10/1992 Baum et al. .
5,343,509 8/1994 Dounies ........ 379/41
5,369,797 11/1994 Tyree ........ 455/351
5,444,433 8/1995 Gropper .

*Primary Examiner*—Reinhard J. Eisenzopf
*Assistant Examiner*—G. Arthur
*Attorney, Agent, or Firm*—Daniel R. Gropper

[57] ABSTRACT

This invention relates to an alert receiver interface, apparatus and method, for receiving and automatically detecting the issuance of emergency, weather or other alert messages broadcast on a radio channel, or on another communication system, and recording that alert message into the receiver with an audible day and time stamp for later playback. Interface apparatus and methods between the alert receiver interface and other communication systems, including paging systems, whereby an alert message, or an alarm tone, is automatically relayed and repeated on an other communication system are disclosed. A method and apparatus for selectively activating an other communication system for only those alert messages of specific concern to users of an other communication system is also taught herein.

43 Claims, 3 Drawing Sheets

ALERT RECEIVER INTERFACE

CROSS REFERENCES TO RELATED APPLICATIONS

This application is a Continuation-In-Part of U.S. patent application Ser. No. 08/337,198, filed Nov. 7, 1994, now U.S. Pat No. 5,574,999 which is a Continuation-In-Part of U.S. patent application Ser. No. 08/207,537, filed Mar. 7, 1994, which is now U.S. Pat. 5,444,433, which issued Aug. 22, 1995.

BACKGROUND OF INVENTION

1. Field of Invention

This invention teaches a method and apparatus for receiving and detecting emergency, weather, or other alert messages broadcast on communications systems in general, and radio communications systems in particular. Also taught is a method and apparatus for automatically recording alert messages and automatically marking each recorded alert message with an audible day, date and time stamp. An interface device for automatically and selectively retransmitting the alert message, and/or alert signal, on other communication systems, including radio, telephone, pagers and other communication technologies, and providing remote access to the recorded alert message, and live broadcast information, through other communication systems, including through radio, telephone and other technologies, now known or hereinafter developed, is also taught herein. Also disclosed is a method and apparatus to alert users on the other communication system that an alert message has been issued, without disrupting communications in progress on that other system.

2. Description of Related Art

Tone activated alert receivers are well known and are regularly used by emergency agencies including fire, police, ambulance and rescue services. The National Weather Service (NWS) transmits an alert signal to activate commonly available weather alert receivers to warn of impending severe and potentially life threatening weather such as tornadoes, thunderstorms, floods and blizzards. Known receivers can be set to issue a siren, flash an LED and/or announce the voice weather alert message in response to receiving and decoding an alert signal.

Previously known alert receivers suffer from major operational defects of the listener missing the alert message if the listener is away from the receiver when the alert is issued. If the flashing LED is first seen some time after the alert message is broadcast, the listener will have to take critical time and effort to determine the time and contents of the alert message. NWS and emergency agencies are also broadcasting digital codes as headers preceding each alert message. This digital header usually contains the type of warning, the effective time and expiration time of the warning and the areas effected. Although the type of the warning can be obtained through decoding the headers, it has been found that much important textual information is not included in the headers. The audible warning message, with an audible day, date and time stamp, needs to be heard in its entirety to convey the full scope of the warning.

It has been found that since warnings are often extremely time critical. Warnings must automatically be received by the ultimate end user, often through other existing and busy communications systems while not interfering with communication in progress on the other communication system.

U.S. Pat. No. 4,031,467 teaches a complicated ALERTING PROCESS AND SYSTEM OF APPARATUS THEREFOR which requires special transmitters and receivers and personnel to activate the warning system.

There are numerous patents directed towards the general mechanisms of integrating telephone answering machines to subscriber paging systems, such as U.S. Pat. Nos. 4,065,642; 4,072,824; 4,821,308; 4,942,598; and 4,961,216. U.S. Pat. No. 5,402,466, in addition to being directed towards the telephone answering machine—pager interface, also discloses an answering machine site alarm—pager interface.

SUMMARY OF THE INVENTION

An object of the present invention is to create a simple and reliable emergency, weather or alert receiver interface into which weather, emergency, or alert messages are automatically recorded for future playback.

Another object of the present invention is to automatically record and audibly day, date and time stamp each alert message recorded into the alert receiver interface so listeners will know when the alert message was received by the alert receiver interface.

Another object of the present invention is to automatically link the alert receiver interface to other communication systems, such as public address systems, land mobile repeater systems, and maritime radio communication systems, in order to permit live or previously recorded alert messages received by the receiver to automatically be relayed and played onto other communication systems.

Another object of the present invention is to have the alert receiver interface operate on low voltage and low current to permit continued operation during commercial power failures by enabling the receiver to operate on back-up batteries.

Another object of the present invention is to permit remote control of the features of the alert receiver interface through presently known or future developed signaling devices over other communications systems.

Another object of the present invention is to provide an alert receiver interface which will permit remote access to the last warning and live broadcast information though other communication systems, such as through radio or telephone systems.

Another object of the present invention is to provide an alert receiver interface which will automatically activate pagers upon decoding and receiving an alert message broadcast on a communication system.

Another object of the present invention is to provide an alert receiver interface which will automatically activate pagers upon decoding and receiving an alert message broadcast on a communication system and relay codes onto the pager indicating the nature of the originally broadcast alert message.

Another object of the present invention is to provide an alert receiver interface which will automatically selectively activate pagers upon decoding and receiving preselected alert messages broadcast on a communication system and will relay special codes onto pagers indicating the nature of the originally broadcast alert message.

Another object of the present invention is to provide an alert receiver interface which will place alert signals or an alert message on other communication systems in a manner so as to automatically prevent interference with communication in process on the other communication system.

DESCRIPTION OF THE PREFERRED EMBODIMENTS

Figure 1:
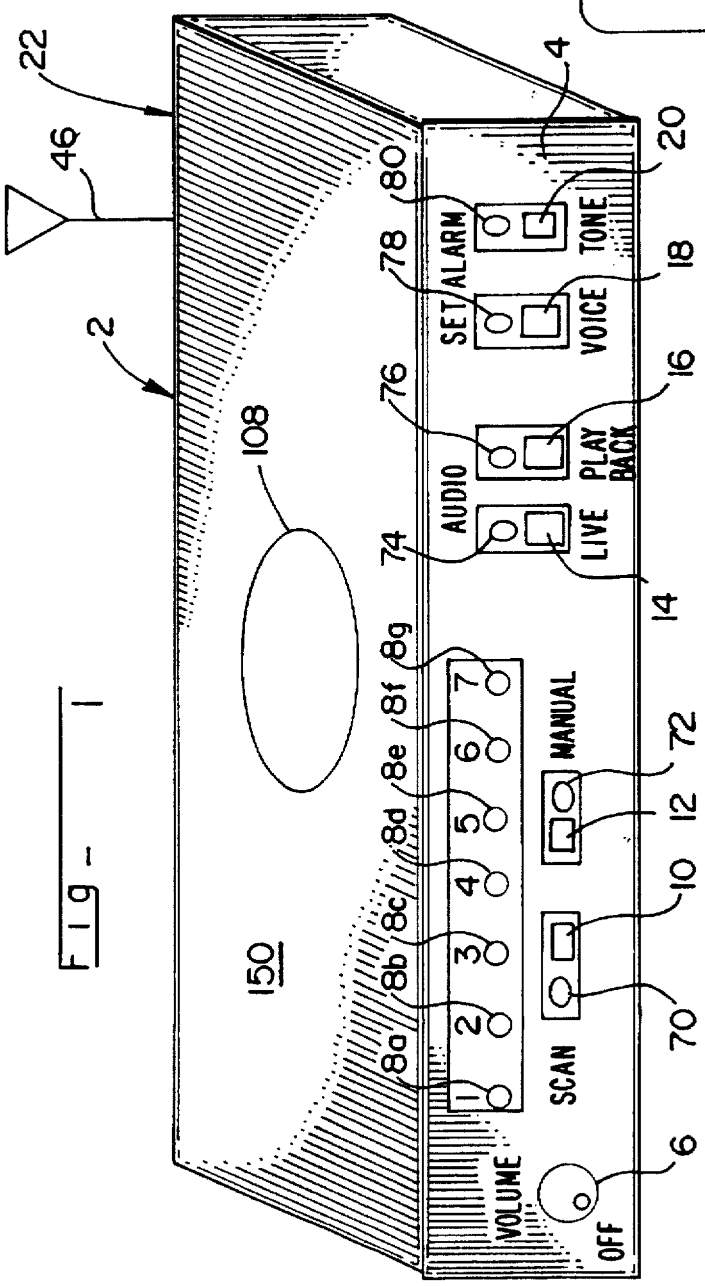
FIG. 1 is a front perspective view of the alert receiver interface.
Figure 2:
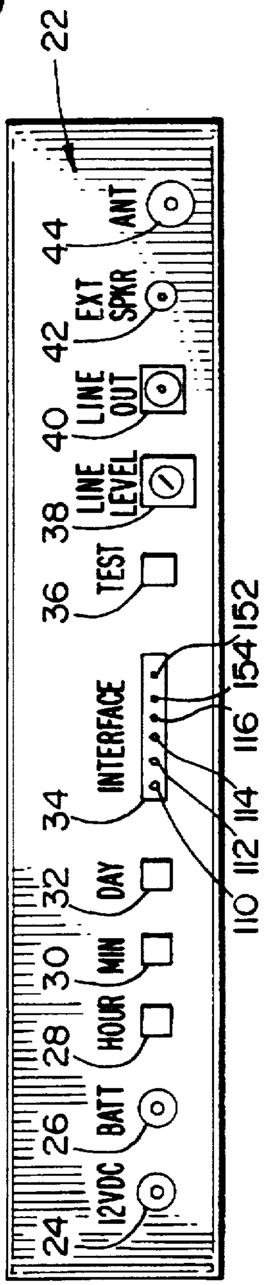
FIG. 2 is a rear elevational view of the alert receiver interface.

FIG. 1 is a front perspective view of alert receiver interface 2. FIG. 2 is a rear elevational view of alert receiver interface 2. Alert receiver interface 2 has a front panel 4, a rear panel 22, and a case, generally shown as 150. The case may be of metal or plastic or of any known or future developed material suitable for enclosing a radio receiver and may be rack mountable.

The following switches and controls are on front panel 4 of alert receiver interface 2: On, off and volume switch 6; channel indication LEDs designated as 8*a*, 8*b*, 8*c*, 8*d*, 8*e*, 8*f*, and 8*g*; scan mode switch 10 and scan mode LED 70; manual mode switch 12 and manual LED 72; live audio switch 14 and live LED 74; playback audio switch 16 and playback LED 76; alarm voice switch 18 and alarm voice LED 78; and alarm tone switch 20 and alarm tone LED 80.

Pressing scan mode switch 10 places alert receiver interface 2 into the scan mode. The scan mode automatically selects the channel with the strongest received signal strength having audio. Each press of manual mode switch 12 sequentially steps alert receiver interface 2 through each preselected channel as is indicated through an alarm tone 136, generated by micro controller unit 62, which is played on speaker 108. Channel indication LED 8*a* through 8*g* indicates which channel has been selected.

Pressing live audio button 14 permits live received audio from the chosen channel to be heard through speaker 108. Any audio appearing at speaker 108 also appears at external speaker jack 42 and at pin 120 of interface connector 34. Audio ground 152 is also a pin of interface connector 34. External speaker jack 42 has an internal switch which shuts off speaker 108 when external speaker jack 42 is in use.

Alarm voice switch 18 and alarm tone switch 20 set the alarm mode of alert receiver interface 2.

Figure 5:
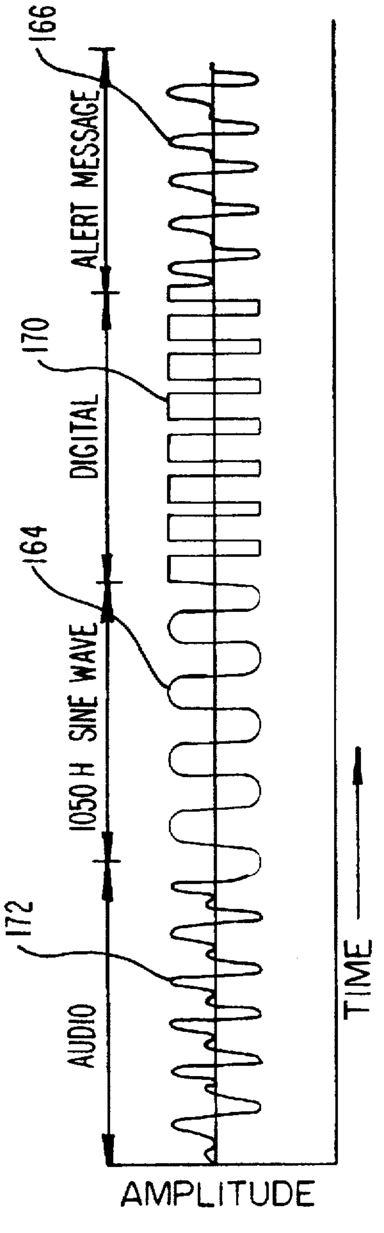
FIG. 5 is a graphic representation of audio signals, a representative analog sine wave alert signal at 1050 Hz, a representative digital alert signal and a representative audio alert message.

FIG. 5 shows a graphic representation of a number of audio signals. Segment 172 represents common analog voice signals. Segment 164 represents an analog alert signal. Segment 170 represents a digital alert signal. Segment 166 represents an alert message following either, or both, analog alert signal 164 or digital alert signal 170.

An alert signal 164 or 170 is defined as a specific tone or tone sequence broadcast or digital sequence to designate that alert message 166 is to follow alert signal 164 and/or 170. For clarity, for the remainder of this specification, the analog alert signal, the digital alert signal, and/or a combination of both types of alert signals will be designated "alert signal 164 or 170."

Alert signal 164 or 170 may be a single tone, a multiple tone sequence, a digital coded sequence or any signaling code hereinafter developed that may be broadcast, received, detected and decoded by alert receiver interface 2.

When alert receiver interface 2 has been set in the alarm voice mode by pressing voice button 78, after detection by audio detection means 98, and microprocessor 62, an incoming alert message 166 is played through speaker 108, as well as through line output 40 and pin 120 on interface connector 34. The audio level of line output 40 and interface 120 is set and adjusted by line level potentiometer 38.

When alert receiver interface 2 is in the alarm tone mode, as set by switch 20, the detection of alert signal 164 or 170 causes alert receiver interface 2 to issue only alarm tones 136, and not voice alert message 166, through speaker 108, external speaker jack 42, line output 40 and external audio output 120.

Thus, the user selects the mode of alert receiver interface 2, before the next alert signal 164 or 170 is detected, to decide whether either voice alert message 166, or only alarm tones 136, are output from alert receiver interface 2. This decision will usually be based on the audience which will receive alert message 166 from alert receiver interface 2. In situations where discrete warnings are required, such as at a public assembly area at a stadium or a theater or in a 911 communication center, alert receiver interface 2 will usually be set in the alarm tone mode. In situations where the threat of life threatening severe weather, or other emergencies, is likely to outweigh any inconvenience caused by alert message 166 interrupting activities in progress, receiver interface 2 is likely to be set in the alarm voice mode.

When alert receiver interface 2 is connected to another communication system, such as a two way land mobile system, when in use logic input 154 is active, neither alert message 166 or live audio 172 are played on line outputs 40 or 120. The exception to this function is that alarm tones 136 are always played on line outputs 40 or 120 irrespective of in use control line 154 becoming active due to use of the other communication system. This permits users on the other alert system to always be immediately notified of the detection of an alert signal 164 or 170 without disrupting communication in progress on the other communication system. This feature is especially important in fire, police, rescue, ambulance and in other public safety communication applications.

Figure 3:
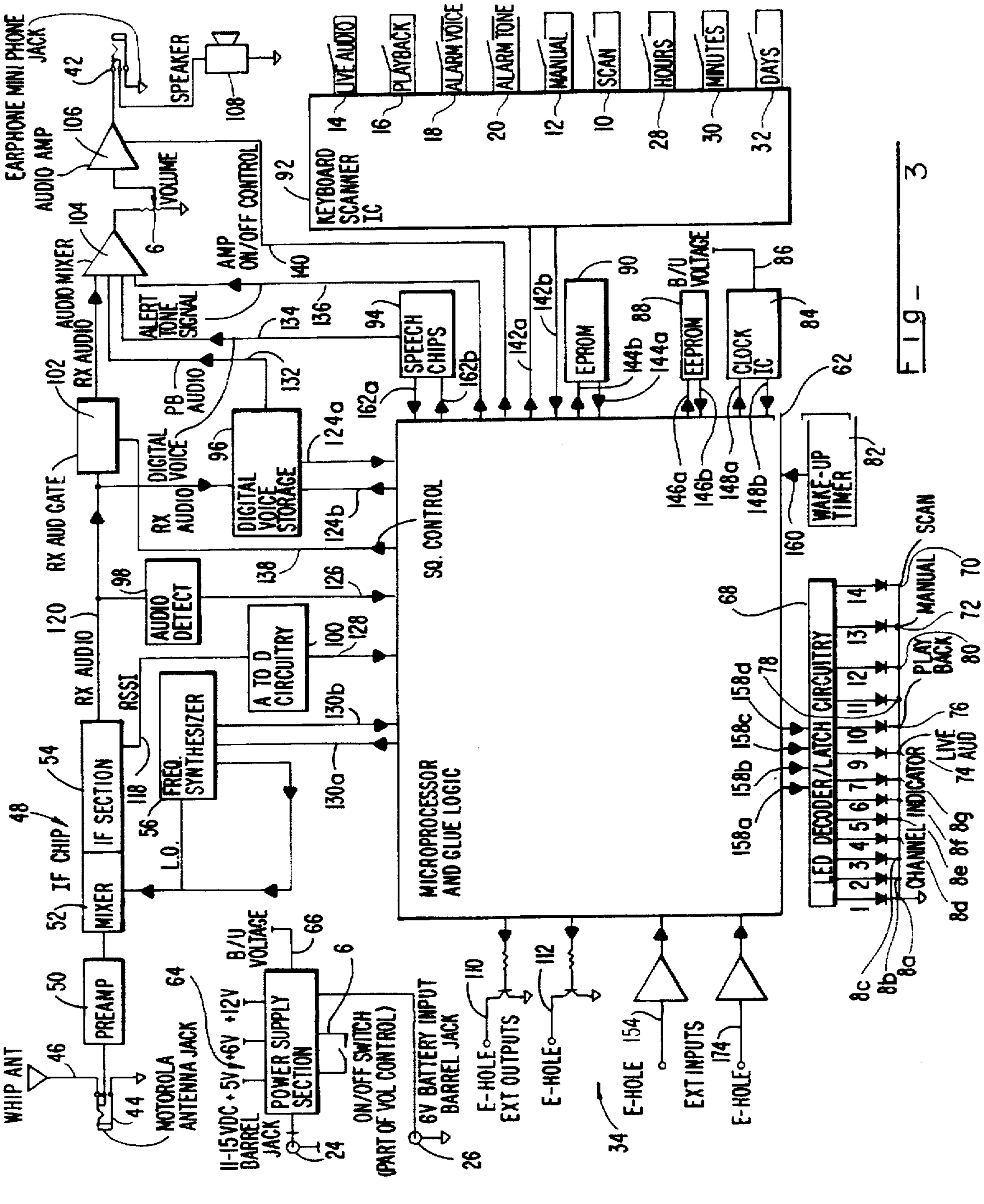
FIG. 3 is a block diagram of the alert receiver interface.

FIG. 3 is a block diagram of alert receiver interface 2. Power for alert receiver interface 2 may be input into alert receiver interface 2 through a variety of means including through DC power jack 24. Power into alert receiver interface 2 may be supplied by a power transformer or similar power supply device from commercially available power sources. Additionally, power may be supplied by connection to automobile, boat, truck or other vehicle DC systems through jack 24. Alternatively, battery power may be input into battery jack 26 to enable alert receiver interface 2 to have battery back-up power should commercial power fail. Alert receiver interface is designed to run on low voltage and low current to permit operation in portable and in power failure or unavailability situations.

Alert receiver interface 2 also saves the day and time stamp when each alert message 166 received and recorded by alert receiver interface 2. The day and time stamp is set through adjustment of hour adjust switch 28, minute adjust switch 30, and day adjust switch 32. An internal backup battery 66 keeps the clock circuitry operating when no power is being applied to alert receiver interface 2 through barrel jack 24, and/or battery input jack 26, to power supply section 64 as controlled by on/off switch 6.

Logic output for automatic control of other communication systems and for control of special alerting devices is provided at pins 110 and 112. Pin 110 goes active each time audio appears at line outputs 120 and 40. Audio will usually appear at external audio outputs 120 and 40 when alert receiver interface 2 is in the alarm voice mode and either live audio switch 14 or playback audio switch 16 is pressed, or when alert signal 164 or 170 is detected by alert receiver interface 2. Pin 110 will also go active each time alert receiver interface 2 generates alarm tone 136. Often logic control line 110 is connected to the Carrier Operated Switch (or COS) of the other communication system. This causes the other communication system to begin to transmit the audio output from the audio line outputs 40 and 120 alert receiver interface 2 on the other communication system.

Pin 112 goes active each time an alert signal 164 or 170 is decoded by alert receiver interface 2. This logic output is used to control other alarm systems such as bells, lights, relays, macros and paging systems. The logic output at pin 112 can be a momentary closure and/or a latched closure for some period of time following each detection of an alert signal 164 or 170.

Test switch 36 simulates the reception and detection of alert signal 164 or 170 by alert receiver interface 2 and initiates the record cycle of alert receiver interface 2.

A female Motorola-type antenna jack 44 is on rear panel 22 of alert receiver interface 2. Motorola antenna jack 44 is configured to accept the base of a telescoping antenna 46 or a standard automobile antenna plug or an adapter to another antenna line connector.

Each time alert signal 164 or 170 is received and detected by alert receiver interface 2, alert message 166, following alert signal 164 or 170, is digitally recorded onto a digital voice storage chips 96. Digital voice storage chips 96 which are controlled by digital voice storage control lines 124*a* and *b* and micro controller unit 62. Recorded alert messages 166 may be played back by pressing playback switch 16, or automatically as part of the alarm voice mode.

Radio receiver section 48 includes antenna 46, Motorola antenna jack 44, RF preamplifier stage 50, IF mixer 52, IF section 54, and frequency synthesizer 56 for the local oscillator. Frequency synthesizer 56 is controlled by microprocessor 62 through control lines 130 a and b.

Figure 4:
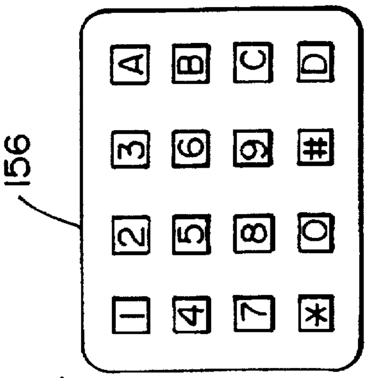
FIG. 4 is a DTMF information entry keypad.

In an alternate embodiment of alert receiver interface 2, a DTMF (dual tone multi frequency) keypad 156, as shown in FIG. 4, can be interfaced with micro controller unit 62, and frequency synthesizer 56, to synthesize different frequencies to permit alert receiver interface 2 to receive radio channels in VHF, UHF, and in other bands.

Additionally, DTMF keypad 156 can be interfaced with micro controller unit 62 to program alert signals detected by audio detect 98 of specific preselected frequencies and tone sequences. In this manner, alert receiver interface 2 can be set by the user for specific needs such as to detect a fire company's alert signal on a public service radio channel and then go through the recording, day and time stamp and playback sequences, as set out above.

LEDs 8*a*–*g*, 74, 76, 78, 80, 72, 70 are controlled by LED decoder/latch circuitry 68 which is in turn controlled by micro controller unit 62 through LED control lines 158*a*, *b*, *c*, and *d*. To conserve power, micro controller unit 62 may be powered down. Micro controller unit's 62 wake up is controlled by wake up timer 82 through wake up timer control line 160.

Micro controller unit 62 receives a clock input from clock IC 84 through clock control lines 148*a* and *b*. Clock IC 84 is powered through power supply 64 and/or through battery back-up 86. Non volatile memory storage is provided to micro controller unit 62 through EEPROM 88 as controlled by EEPROM control lines 146*a* and *b*.

The software program to control micro controller unit 62 is stored in EPROM 90 as controlled by EPROM control lines 144*a* and *b*.

Keyboard functions of alert receiver interface 2 are sensed by micro controller unit 62 through keyboard scanner IC 92. Switches 14, 16, 18, 20, 12, 10, 28, 30, and 32 are connected to keyboard scanner IC 92. Keyboard scanner IC 92 is controlled through keyboard scanner control lines 142*a* and *b*. Digital speech for audible day and time stamp functions are provided by speech chip 94 through speech chip control lines 162*a* and 162*b*. The digital voice output of speech chips 94 is provided to audio mixer 104 through digital voice audio output line 134. Alert signal 164 or 170 is detected by audio detector 98 through monitoring received audio output 120 from radio receiver section 48. Alert signal 164 or 170 may be decoded by an algorithm programmed into micro controller unit 62, as detected by an op amp audio slicer, or by an external phase lock loop tone detection device, generally shown as 98. The logic output from these devices is fed into micro controller unit 62 by means of audio detect logic line 126.

Analog to digital conversion circuitry 100 is connected to micro controller unit 62 by analog to digital control line 128. The analog to digital circuitry monitors the received signal strength indication of IF section 54 of radio receiver 48 by means of received signal strength input line 118. As part of scan mode function of alert receiver interface 2, analog to digital circuitry 100 senses the relative received analog signal strength output 118 of IF section 54 of radio receiver 48 and writes a digital word corresponding to the relative received signal strength into EEPROM 88, or into micro controller unit 62, by means of analog to digital control line 128. At the end of each scan cycle micro controller unit 62 chooses the channel with relatively strongest signal strength as the signal to monitor. The scan routine can be based on a preset time or on lost signal strength for a preset time or on other bases as dictated by the application.

Due to equipment failures and other malfunctions, such as downed telephone lines or broken recording studio consoles, the weather or emergency radio transmitting station may transmit an unmodulated carrier. An unmodulated carrier provides no useful information to alert receiver interface 2. Since speaker 108 is normally muted, it is likely that the occurrence of an unmodulated carrier will go undetected thereby giving alert receiver interface 2 users a false sense of security.

Modulated audio may be detected by means of a peak detector whereby if a predetermined number of modulated peaks are not detected within a predetermined time frame, micro controller unit 62 will automatically initiate a new scan routine seeking the strongest received radio channel having modulated audio. In this manner, alert receiver interface 2 will automatically choose the channel with the second strongest received signal strength having modulated audio if the channel with the strongest received signal does not have modulated audio. The audio detection scan routine can be based on a preset time or on lost audio signal for a preset time or on other bases as dictated by the application.

The scan function of alert receiver interface 2 is well adapted for use in mobile installations such as in cars, boats and trucks. As the vehicle moves, alert receiver interface 2 will automatically seek the broadcast radio channel with the strongest modulated signal from a preselected set of channels. The selection process also will work well where the coverage area of different transmitters on different channels overlaps. In these situations, alert receiver interface 2 will automatically seek the channel with the strongest received signal having modulated audio from the set of preselected channels.

In fixed installations, the scan feature serves to automatically choose a backup channel if the channel with the strongest received signal either looses carrier or loses modulated audio. Thus, the alert receivers scan feature may become a critical life saving feature in the event that the primary broadcast radio channel becomes disabled through either signal strength or loss of audio.

Received audio gate 102 is controlled by mute control line 138, which, in turn, is controlled by micro controller unit 62. Received audio gate 102 mutes received audio 120 entering audio mixer 104 when alert receiver interface 2 is in the playback alert mode, the alarm voice mode or the alarm tone mode. Audio mixer 104 combines received audio signal 120, playback audio 132 from digital storage unit 96, synthesized speech voice from speech chips 94, through digital voice output line 134, and alarm tone 168, generated by micro controller unit 62, as ported to audio mixer 104 through audio line 136.

The output level of audio mixer 104 is adjusted through potentiometer 6. The audio is then ported to audio amplifier 106. Audio amplifier 106 is controlled by audio amp control line 140. The output of audio amplifier 106 is then ported to external speaker jack 42 and speaker 108.

In operation, micro controller unit 62 of alert receiver interface 2 is programmed to detect alert signal 164 or 170 issued by an agency, such as the National Weather Service, or by another emergency agency such as the police, fire, rescue or ambulance services or by private radio services.

Upon detecting alert signal 164 or 170, micro controller unit 62 causes alert message 166, following alert signal 164 or 170, to be digitally recorded onto digital voice storage chips 96. The length of alert message 166 to be recorded is limited only by the storage capacity of digital recorder chips 96. Alert message 166 is then automatically day and time stamped by micro controller unit 62. Playback switch 16 is activated to playback alert message 166.

The sequence period and audio frequency of alarm tones 168 is programmed into micro controller unit 62. The number and length of time over which alarm tones 168 are generated should be sufficient to alert listeners to the detection of alert message 166. The timing and frequency of alarm tones 168 should not unduly interfere with ongoing communication on the other communication system. For example, two alarm tones 168 per minute for five minutes might be sufficient to alert without disrupting communication in progress on the other communication system.

If alert signal 164 or 170 is detected by audio detection means 98 and alert receiver interface 2 is in the alarm voice mode, alert message 166 will be played on the other communication system through line out 40 and 120. Additionally, at any time, pressing playback button 76 will, when the alert receiver interface 2 is in the alarm voice mode, will play the alert message 166, previously recorded on the digital voice record chips 96 through line out 40 and 120 with audible day and time stamp. This feature makes the alert receiver interface 2 well suited for use in broadcast radio stations as it gives the announcer time to review alert message 166 and to alert the listeners that he or she is about to play alert message 166 on the air.

Audio input port 174 is provided to accept remote control signals, such as by DTMF (Dual Tone Multi Frequency), to enable users of alert receiver interface 2 to remotely control its functions, and in particular, to remotely playback alert message 166 or to link and play live audio 172 on other communication systems. DTMF decoders are commonly known in the industry and many standard configurations can be used in this application. DTMF commands are usually input via a DTMF keypad as is shown in FIG. 4.

A remote control head, with the functions of the switches on front panel 4 of alert receiver interface 2, may also be input into logic input port 154. A remote control head can be connected to alert receiver interface 2 in any commonly known manner such as hard wire or radio frequency. A remote control head is especially important in applications in buildings with extensive amounts of steel and computers in which alert receiver interface 2 must be located in the buildings penthouse, or a place with easy access to an outdoor antenna, and the functions of alert receiver interface 2 are needed elsewhere in the building. This feature is also important for emergency operations centers which are usually located in underground areas.

To indicate the detection and recording of a new and unplayed alert message 166, playback LED 76 will flash from the time alert signal 136 is detected by audio detection means 98 until playback switch 16 is activated.

In a another embodiment of the present invention, alert receiver interface 2 can be programmed to activate speaker 108 and line output 40 and 120 and alarm output 112 only in response to specific messages containing a specific digital alert code 170. Similarly, alert receiver interface 2 can be programmed to only activate other communication systems, including paging and subscriber paging systems, in response to specific messages containing a specific digital alert code 170. The specific digital codes permitting activation of the outputs of alert receiver interface 2 and other communication systems may be programmed into micro controller unit 62 of alert receiver interface 2 by means of keypad 156.

For example, if alert message 166 is a tornado warning for a particular county, and the weather service transmits, in addition to alert message 166, a digital alert signal 170 containing the digital code for that particular county, and the user of alert receiver interface 2 has programmed alert receiver interface 2 to detect this digital code 170, speaker 108, line output 40 and 120 and alarm output 112 will become active. In this manner the number of warnings which are received and acted upon by alert receiver interface 2 are held to a minimum and alert receiver interface 2 filters out warnings which are not of interest to a particular user group. With this feature it is more likely that alert receivers 2 connected to other communication systems, such as public address systems, land mobile and public service repeater systems, will be used in the alarm voice mode as the number of alerts that are inapplicable to that user group are reduced through this digital selective calling feature.

Additionally, alert receiver interface 2 can be programmed to detect and decode specific digital warnings 170 (for example tornado and thunderstorm) and activate pagers and other communication systems with output codes and alarms specific to the type of digital alert 170 detected by alert receiver interface 2.

Alert receiver interface 2 can be used in a multitude of applications where radio voice mail applications are required including in pocket pagers, for lifeguards and rangers temporarily away from their posts and for traveling sales people and emergency service personnel temporarily out of their vehicle. Alert receiver interface 2 can also be installed in emergency vehicles and in emergency stations, such as fire houses and in fire trucks, to automatically receive and record alert message 166 which would then be instantly available for the emergency service workers when they reached their station and/or equipment. Alert receiver interface 2 would also be extremely useful to pools, concert halls and other outdoor public assembly areas to instantly and automatically warn of alert messages.

It is understood that while radio communication systems are primarily discussed herein, alert receiver interface 2 can be adapted to work with almost any communication system, presently known or developed in the future, over which an alert signal 164 or 170, followed by an alert message 166, can be transmitted. Alert signal 164 or 170 and alert message 166 may be received by alert receiver interface 2 through the air, through cable or through any communication technology now known or developed in the future.

While specific embodiments of the invention have been shown and described in detail to illustrate the application of the principles of the invention, it will be understood that the invention may be embodied otherwise without departing such principles.

What I claim is:

1. An alert receiver interface comprising:
 a. information broadcast means;
 b. information receiving means;
 c. alert message means, transmitted on said information broadcast means;
 d. alert signal means, transmitted on said information broadcast means, before said alert message means is transmitted on said information broadcast means, said alert signal means having a beginning and an end;
 e. detecting means, connected to said information receiving means, to detect said beginning of said alert signal means transmitted on said information broadcast means and to detect said end of said alert signal means transmitted on said information broadcast means;
 f. recording means, connected to said information receiving means, configured to begin recording said alert message means, received by said information receiving means, after said end of said alert signal means;
 g. audible day and time stamp means, connected to said information receiving means, which updates and stores the current day and time each time said alert signal means is decoded by said detecting means; and,
 h. playback means, connected to said information receiving means, for playing back said audible day and time stamp means and said alert message means.

2. An alert receiver interface, as recited in claim 1, wherein said information broadcast means is radio.

3. An alert receiver interface, as recited in claim 1, wherein said information receiving means is radio.

4. An alert receiver interface, as recited in claim 1, wherein said information receiving means receives government sponsored weather information.

5. An alert receiver interface, as recited in claim 1, wherein said alert signal means is at least one oscillating tone.

6. An alert receiver interface, as recited in claim 5, wherein said alert signal means has a frequency of 1050 Hz.

7. An alert receiver interface, as recited in claim 5, wherein said alert signal means comprises a plurality of sequential tones.

8. An alert receiver interface, as recited in claim 1, wherein said alert signal means comprises a coded digital sequence.

9. An alert receiver interface, as recited in claim 1, wherein said alert message means is a severe weather message.

10. An alert receiver interface, as recited in claim 1, wherein said alert message means is an emergency message.

11. An alert receiver interface, as recited in claim 1, wherein said broadcast radio alert message means is a non emergency message.

12. An alert receiver interface, as recited in claim 1, wherein said information receiving means is a narrow band FM receiver.

13. An alert receiver interface, as recited in claim 1, wherein said detecting means comprises a phase locked loop.

14. An alert receiver interface, as recited in claim 1, wherein said detecting means comprises means for analyzing sliced data.

15. An alert receiver interface, as recited in claim 14, further comprising micro controller means to analyze said sliced data.

16. An alert receiver interface, as recited in claim 1, wherein said recording means further comprises digital recorder means.

17. An alert receiver interface, as recited in claim 1, wherein said recording means further comprises analog recorder means.

18. An alert receiver interface, as recited in claim 1, wherein said updated audible day and time stamp means data is stored in digital form.

19. An alert receiver interface, as recited in claim 1, wherein said updated audible day and time stamp means data is stored in analog form.

20. An alert receiver interface, as recited in claim 1, further comprising micro controller means to control the playback of said recorded alert message means.

21. An alert receiver interface, as recited in claim 1, further comprising micro controller means to control the playback of said audible day and time stamp means.

22. An alert receiver interface, as recited in claim 1, further comprising at least one logic closure circuit which is triggered when said alert signal means is detected by said detecting means.

23. An alert receiver interface, as recited in claim 1, further comprising at least one logic closure circuit which remains active for a time period after said alert signal means is detected by said detecting means.

24. An alert receiver interface, as recited in claim 1, further comprising at least one external audio output circuit.

25. An alert receiver interface, as recited in claim 24, further comprising at least one logic closure circuit which is active when audio appears at said external audio output.

26. An alert receiver interface, as recited in claim 24, at which audio appears at said external audio output in the time period beginning when said detecting means detects the end of said alert signal means and continues for a time period after said detecting means detects the end of said alert signal means.

27. An alert receiver interface, as recited in claim 24, further comprising at least one external audio output circuit at which audio appears when said alert message means is played back.

28. An alert receiver interface, as recited in claim 24, further comprising at least one logic closure circuit which is active when said alert message means is played back.

29. An alert receiver interface, as recited in claim 24, further comprising at least one external audio output circuit at which live audio appears when said information receiving means is receiving live audio which is directed to said external audio output circuit.

30. An alert receiver interface, as recited in claim 24, further comprising at least one logic closure circuit which is active when said information receiving means is receiving live audio which is directed to said external audio output circuit.

31. An alert receiver interface, as recited in claim 24, further comprising an in use detection logic input circuit, wherein when said in use detection logic circuit is active said external audio sources from said information receiving means are muted.

32. An alert receiver interface, as recited in claim 24, further comprising other communication system, wherein said external audio circuit is connected to said other communication system.

33. An alert receiver interface, as recited in claim 24, wherein said at least one logic closure circuit is connected to said other communication system.

34. An alert receiver interface, as recited in claim 32, connected to said information receiving means, further comprising means for detecting remote control signaling instructions from said other communication system.

35. An alert receiver interface, as recited in claim 34, wherein said means for detecting remote control signaling instructions from said other communication system is by DTMF signaling.

36. An alert receiver interface, as recited in claim 1, further comprising means for activating paging systems upon said detecting means detecting said alert signal means.

37. An alert receiver interface, as recited in claim 32, wherein said other communication system is a public switched telephone network.

38. An alert receiver interface, as recited in claim 32, further comprising means for remote access to said recorded alert message and to said corresponding day and time stamp recorded on said recording means through said other communication system.

39. An alert receiver interface, as recited in claim 32, further comprising means for remote access to live information broadcast on said information broadcast means through said other communication system.

40. An alert receiver interface, as recited in claim 32, further comprising means for remote access to said recorded alert message and to said corresponding day and time stamp recorded on said recording means through said other communication system through DTMF.

41. An alert receiver interface, as recited in claim 32, further comprising means for remote access to live information broadcast on said information broadcast means through said other communication system through DTMF.

42. An alert receiver interface, as recited in claim 1, further comprising means for detecting and decoding a digital code broadcast on said information broadcast means and further comprising means for activating paging systems with different codes corresponding to different types of said digital codes broadcast on said information broadcast means.

43. An alert receiver interface, as recited in claim 1, further comprising means for detecting and decoding a digital code broadcast on said information broadcast means and further comprising means for selectively activating paging systems only for preselected digital codes broadcast on said information broadcast means.

* * * * *